United States Patent Office 3,478,836
Patented Nov. 18, 1969

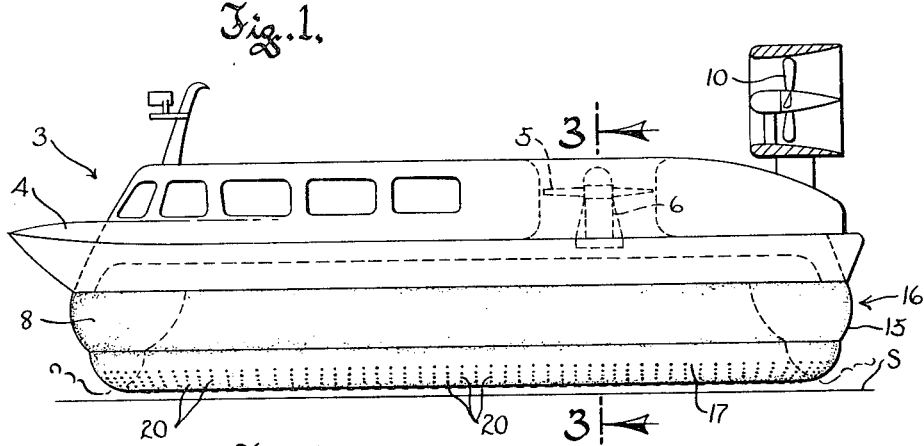
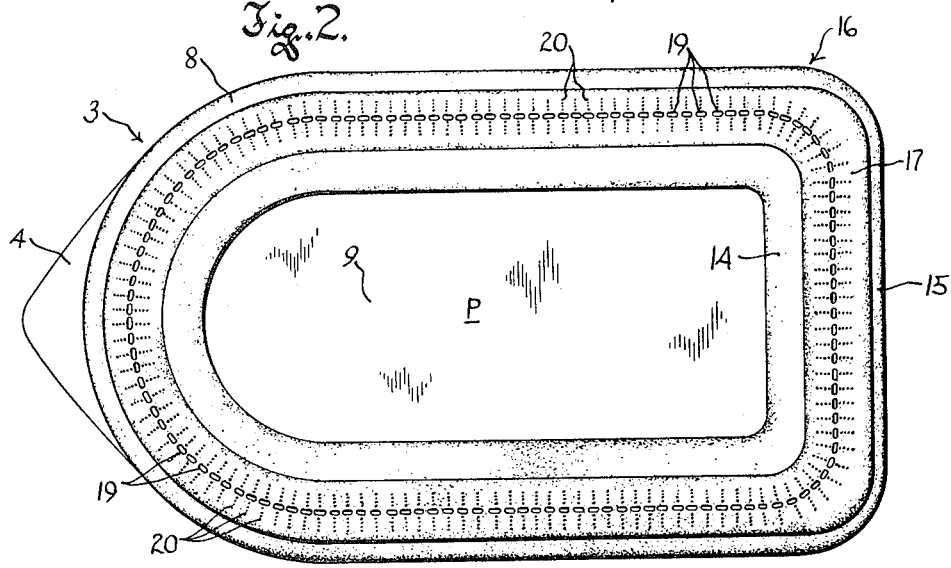
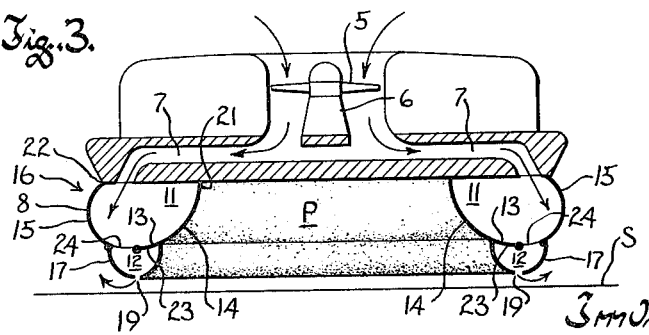

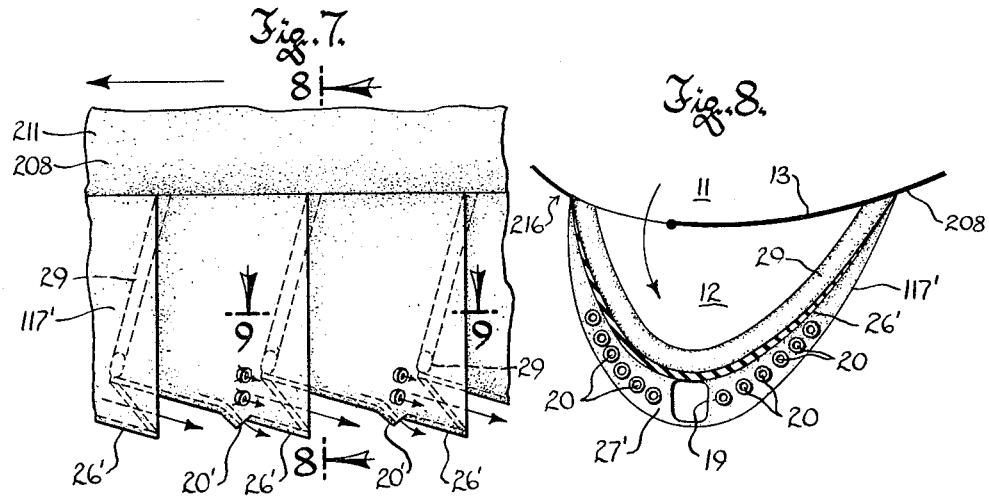
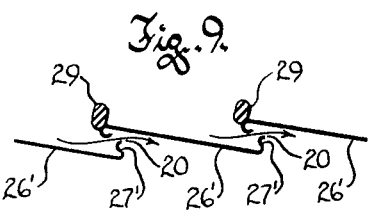
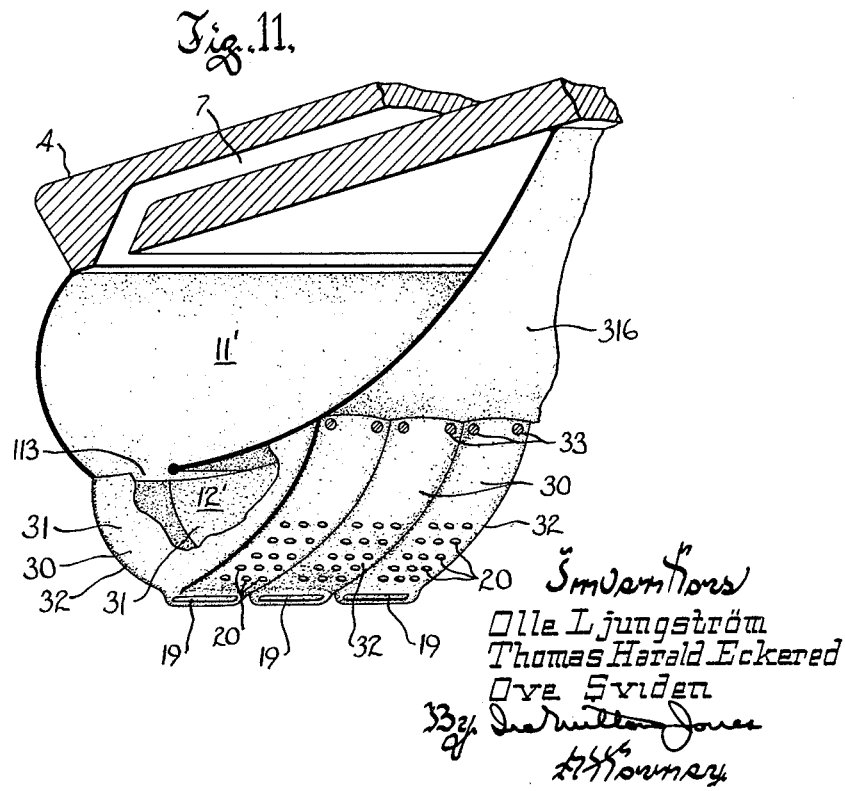

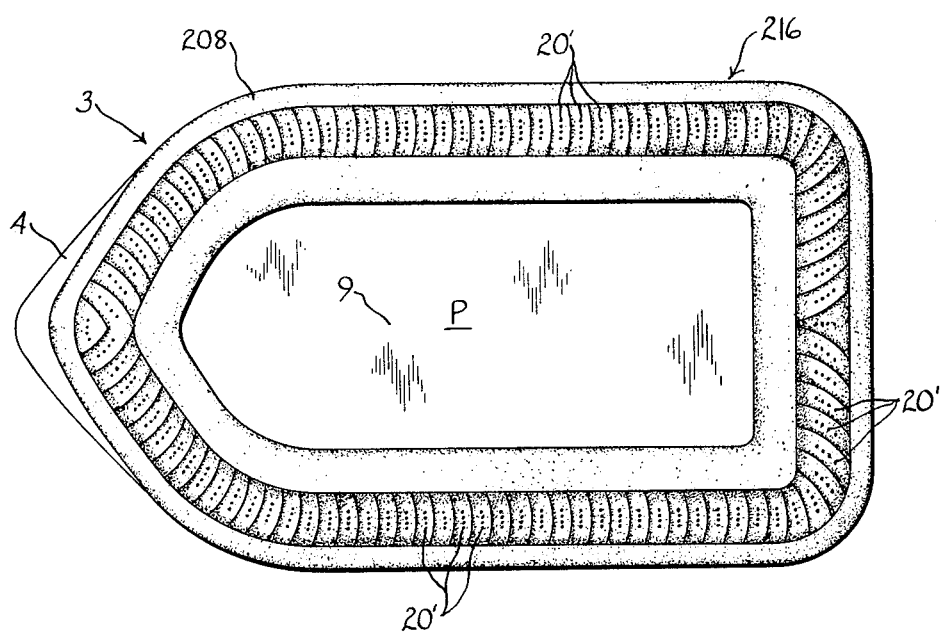

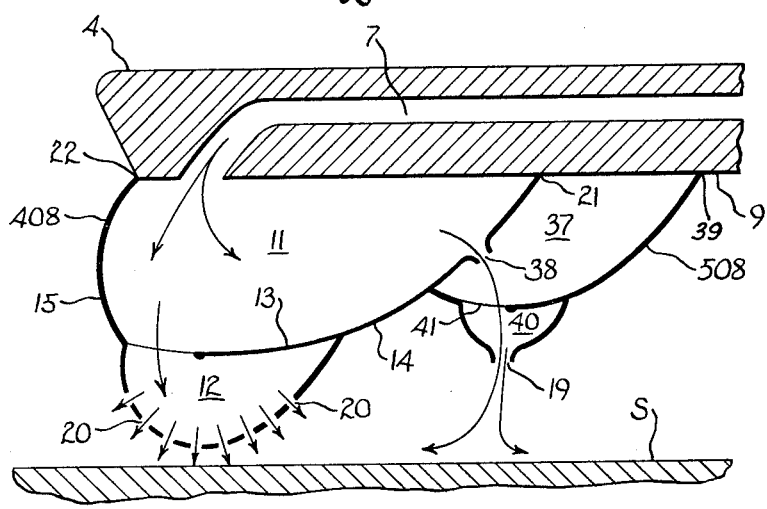
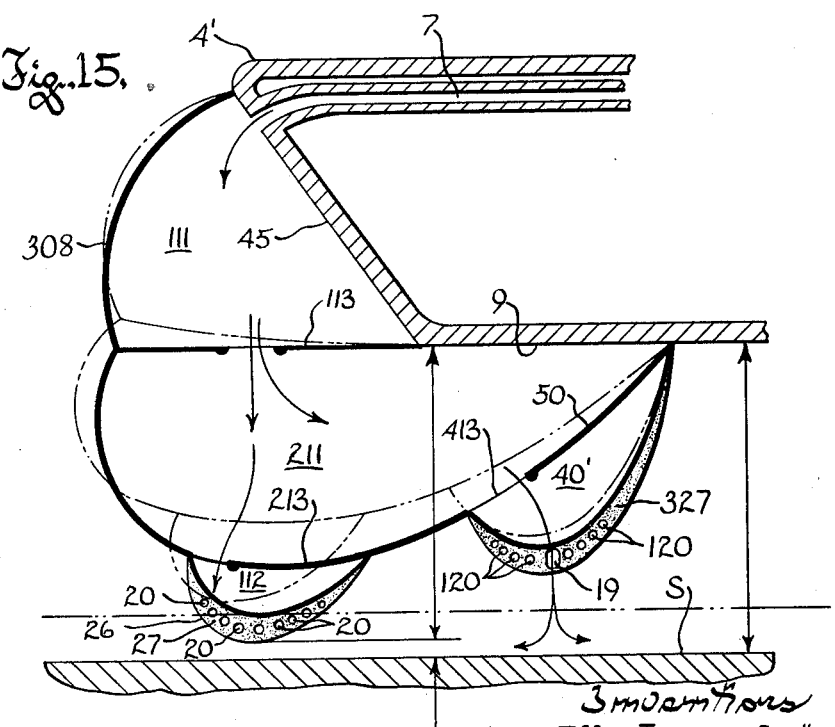

3,478,836
CUSHION VEHICLE HAVING INFLATABLE SKIRT
Thomas Harald Eckered, Stockholm, Ove Sviden, Linkoping, and Olle Ljungström, Lidingo, Sweden, assignors to Saab Aktiebolag, Linkoping, Sweden, a corporation of Sweden
Filed Apr. 3, 1967, Ser. No. 627,691
Claims priority, application Sweden, Apr. 4, 1966, 4,466/66
Int. Cl. B60v *1/16;* B63b *1/34*
U.S. Cl. 180—128                                              1 Claim

ABSTRACT OF THE DISCLOSURE

An inflatable skirt depending from the hull of an air cushion vehicle is divided into vertically superimposed compartments, whereby its distension under inflation is so controlled that the skirt has small thickness at its bottom, resulting in low drag upon water contact. Air outlets in the bottom of the inflatable skirt are arranged to direct a film of air along its surface to lubricate it, minimize water contact and improve sustentation efficiency.

---

This invention relates to so-called air cushion or ground effect vehicles which support themselves at a small distance above the surface of land or water on a cushion of downwardly displaced air; and the invention relates more particularly to novel means on such a vehicle defining a yieldable skirt that projects downwardly from the hull of the vehicle all around its periphery and cooperates with the bottom of the hull in defining a plenum, the yielding character of such skirt enabling it to accommodate irregularities in the surface over which the vehicle travels.

Inasmuch as air cushion vehicles ride only a few inches above the surface, the vehicle occasionaly strikes the top of a wave or encounters the water or land beneath it as a result of its own heaving, rolling or pitching movement. Such contact with water normally has an adverse effect upon the speed of the vehicle. The increase in drag resulting from water contact depends upon the geometrical shape and the rigidity of that portion of the vehicle which encounters the water, the size of the surface that encounters the water, and the friction of that surface.

In addition to the adverse effect upon the propulsion economy of the vehicle, water waves and the heave, roll and pitch movements of the vehicle have a detrimental effect upon its hovering efficiency insofar as they increase the distance between the vehicle and the surface beneath it and thus permit increased leakage of compressed air out of the plenum beneath its hull.

The general object of the present invention is to provide an air cushion vehicle having a yielding skirt around the periphery of its hull that cooperates with the bottom of the hull in defining a plenum, said skirt comprising an inflatable structure of supple material that is provided with outlet means at its bottom and is held in shape by pressure air flowing to the outlet means to be expelled for maintenance of the air cushion under the vehicle, the soft, resilient character of the skirt enabling its local height to vary automatically with the pitching, heaving and rolling movements of the vehicle and with waves encountered by the vehicle, so that the skirt can, by local deformation, tend to maintain itself at a certain distance above the surface of the water and thus avoid contact with the water.

More specifically it is an object of this invention to provide an inflatable skirt for an air cushion vehicle of the character described which skirt has low profile drag and is so arranged that such portions of its as might come into contact with water are of comparatively small area and offer low friction drag.

Another object of this invention is to provide, in an air cushion vehicle, an inflatable skirt of the character described having air outlet means so arranged as to maintain a film of air over the lower portion of the exterior surface of the skirt whereby said surface is in effect lubricated, such film of air serving, in conjunction with the resilient softness of the bottom part of the skirt, to prevent contact between the skirt and water over which the vehicle travels.

It is also an object of this invention to provide a skirt for an air cushion vehicle of the character described whereby the vehicle is enabled to hover at a very small distance above the surface without likelihood of collision with the crests of waves or with other surface irregularities, to thus be capable of achieving sustentation with a minimum expenditure of power.

With the above and other objects in view which will appear as the description proceeds, this invention resides in the novel construction, combination and arrangement of parts substantially as hereinafter described.

The accompanying drawings illustrate several complete examples of physical embodiments of the invention constructed according to the best modes so far devised for the practical application of the principles thereof, and in which:

FIGURE 1 is a view in side elevation of an amphibious air cushion vehicle embodying the principles of this invention;

FIGURE 2 is a bottom plan view of the vehicle shown in FIGURE 1;

FIGURE 3 is a sectional view taken on the plane of the line 3—3 in FIGURE 1;

FIGURE 4 is a fragmentary cross sectional view, on a larger scale, of the inflatable skirt shown in FIGURES 1, 2 and 3;

FIGURE 5 is a fragmentary sectional view on a further enlarged scale taken on the plane of the line 5—5 in FIGURE 4;

FIGURE 6 is a fragmentary perspective view of a modified embodiment of the invention;

FIGURE 7 is a fragmentary view in side elevation of another embodiment of the invention;

FIGURE 8 is sectional view taken on the plane of the line 8—8 in FIGURE 7;

FIGURE 9 is a detail sectional view on an enlarged scale taken on the plane of the line 9—9 in FIGURE 7;

FIGURE 10 is a bottom plan view of an air cushion vehicle incorporating the embodiment of the invention illustrated in FIGURES 7–9;

FIGURES 11 and 12 are views similar to FIGURE 6 but respectively illustrating other embodiments of the invention; and FIGURES 13, 14 and 15 are views generally similar to FIGURE 4 but respectively illustrating still other embodiments of the invention.

Figure 12:
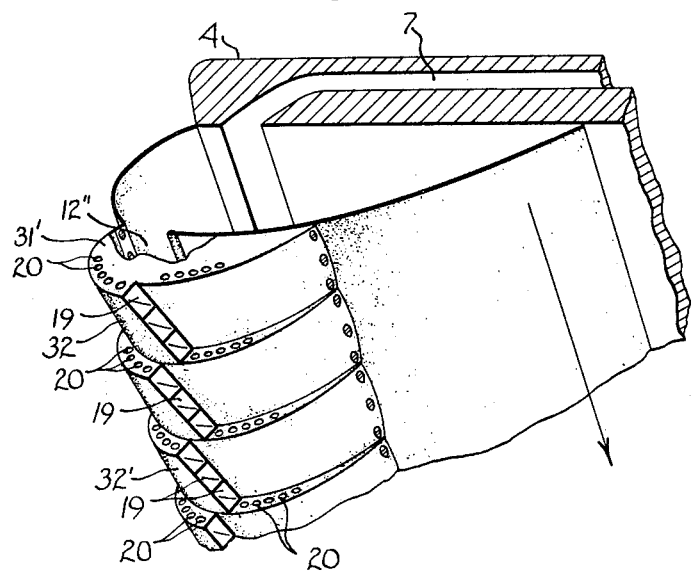

Referring now more particularly to the accompanying drawings, the numeral 3 designates generally an amphibious air cushion vehicle having a hull 4 of generally rigid construction in which is carried means providing a source of air under pressure comprising a compressor fan 5 driven by an engine 6. Air drawn from above the vehicle and pressurized by the fan 5 is fed by way of ducts 7 in the hull to the interior of a hollow inflatable skirt 8 that extends around the periphery of the hull and projects downwardly therefrom to cooperate with the bottom wall 9 of the hull in defining a plenum chamber P beneath the vehicle. The pressurized air is expelled from the skirt 8 through outlets 19 and 20 at its bottom (described hereinafter) to produce an air cushion in the plenum P and a curtain of air surrounding the air cushion and extending from the bottom of the skirt to the surface therebeneath.

A ducted fan 10, rotating on a substantially horizontal axis, propels the vehicle in a known manner.

According to the present invention the construction of the inflatable skirt 8 is such that it comprises a plurality of vertically superimposed compartments that decrease in width toward its bottom so that the lowest portion of the skirt, which is the part most likely to encounter waves or otherwise come into contact with water, is relatively narrow and therefore produces only a small amount of drag in consequence of water contact.

In the embodiment of the invention illustrated in FIGURES 3 and 4, the inflatable skirt has two communicated compartments, namely an upper compartment 11 that is adjacent to the underside of the hull and a narrower bottom compartment 12. The external surfaces of the inflatable skirt structure are defined by a unitary member 16 of supple, substantially air tight material that can be molded or otherwise formed to be generally U-shaped in cross section and to have a ring-like planform conforming to that of the hull of the vehicle. The legs of the U-shaped member provide the inner and outer side walls 14 and 15 of the upper compartment 11 while its bight portion provides the external arcuate-section wall 17 of the lower compartment 12.

The edges 21 and 22 of the member 16 are sealingly secured to the bottom wall of the hull, the outer edge 22 being secured along the outer edge of the bottom wall 9 and the inner edge 21 being spaced a substantially uniform distance inwardly from the outer edge all around the hull. The compressed air ducting 7 of course opens to the space between the sealed edges 21 and 22.

The upper and lower compartments are defined by a web 13 that extends across the member 16, generally parallel to the bottom wall 9 of the hull. The web can be of any suitable construction, so long as it provides for communication between the compartments above and below it and serves to draw the legs of the U-shaped member 16 into pleats along the lines of its connection thereto, so that when inflated the member 16 has a sort of figure 8 cross section all along its length. The web is connected to the U-shaped member along lines that are located low enough on it to insure that the external wall 17 of the bottom compartment 12 will be maintained on an arc of relatively small radius when the skirt is inflated, so that the skirt will have small thickness at its bottom.

As shown, the web 13 comprises a strip 23 of fabric or the like having one edge connected directly to the inner leg of the U-shaped member 16 and having its other edge spaced from the outer leg of that member but connected therewith at regularly spaced intervals along its length by means of suitable tension members 24 that can comprise, for example, lengths of wire or fingers of the same material as the strip 23. The spaces between the tension members 24 of course provide for substantially unrestricted flow of pressurized air from the upper compartment 11 to the bottom compartment 12.

The air outlets in the inflatable skirt, which are located in the external arcuate wall 17 of its bottom compartment, comprise large outlet apertures 19 at regularly spaced intervals and numerous small outlets 20.

The air issuing from the larger outlets 19 is primarily intended to produce the cushion of air upon which the vehicle is supported, while the air issuing from the smaller outlets 20 is primarily intended to maintain a film of moving air over the bottom surface 17 of the skirt which tends to prevent actual contact between water and the surface of the skirt when the vehicle encounters waves or undergoes pitching, heaving or rolling movements, and by which the bottom portion of the skirt can be said to be lubricated. The film of moving air also tends to prevent leakage of compressed air out of the plenum P through the space beneath the skirt.

Both the larger outlets 19 and the smaller outlets 20 are arranged to direct the air issuing from them generally lengthwise along the skirt in the direction toward the rear of the vehicle but preferably somewhat inwardly relative to the skirt. To this end the outlets 19 and 20 can be formed as shown in FIGURE 5, with a downwardly and rearwardly inclined lower lip 25 similar to a tooth on a grater. This configuration not only serves the desired purpose of directing the air rearwardly along the exterior surface of the wall structure, but also tends to prevent water from entering the outlet when the vehicle is moving forward.

When the vehicle is hovering, the pressure of air in the plenum P defined by the hull and the skirt is higher than that of the atmospheric air outside the skirt periphery, although of course somewhat lower than that of the pressurized air in the interior of the skirt by which the skirt is maintained inflated. Under the opposing forces resulting from plenum and atmospheric pressures, the skirt is urged outwardly away from the center of the plenum, and it tends to yield in the direction that carries it from its position shown in solid lines in FIGURE 4 toward the position shown in broken lines. Stated another way, the air pressure differential to which the skirt is subjected tends to swing the U-section skirt-defining member outwardly about its upper edges 21 and 22, the lower portion thereof being likewise urged to swing outwardly about the lines of connection of the web 13 with its wall portion 17.

Such outward pressure responsive swinging of the inflatable skirt carries its bottom portion 17 in an arc having a substantial upward component.

When stable, steady hovering conditions exist, the skirt will be held by the opposing pressures upon it in a position at which there will be a certain distance between the bottom wall 9 of the hull and the surface S beneath the vehicle, and a certain small distance between the surface S and the bottom wall portion 17 of the skirt. Assume now that the vehicle undergoes a relative downward movement by which the bottom wall 9 of its hull is brought closer to the surface S, either by reason of a surface irregularity such as a wave or by reason of pitching or rolling movement of the vehicle. Such relative downward movement of the vehicle decreases the volume of the plenum P and thereby increases the pressure of the air in the plenum, with the result that the skirt is swung outwardly away from the center of the plenum in response to the altered relationship of the pressures acting upon its opposite side surfaces. Such outward swinging of the skirt carries its bottom wall portion 17 upwardly relative to the vehicle hull, thus preventing contact between the skirt and the surface S beneath the vehicle. In this manner the skirt accommodates itself substantially instantaneously to any decrease in the distance between the bottom wall 9 of the hull and the surface S.

If, now, the hull of the vehicle moves relatively upwardly away from the surface S, as during heaving motion of the vehicle, the pressure of air in the plenum P will decrease as the result of increase in the volume of the plenum, permitting the skirt to move inwardly so that its bottom wall portion 17 is carried downwardly relative to the bottom wall 9 of the hull. In this case the accommodation of the skirt causes leakage of air out of the plenum, through the space between the skirt bottom and the surface S, to be substantially less than what it would be in heaving of an air cushion vehicle having a substantially rigid skirt.

It will be apparent that the skirt of this invention is effective in damping heaving movements of the vehicle. It is similarly effective in damping pitching and rolling movements and in avoiding surface contact in consequence of such movements, inasmuch as localized portions of the skirt can deflect independently of the remainder thereof.

Because the wall 17 of the bottom compartment has a substantially small radius of curvature as compared with the walls 14 and 15 of the upper compartment, and a much smaller radius than it would have if the inflatable skirt were not vertically compartmented, the bottom compartment yields more readily than the upper compartment (and much more readily than an uncompartmented skirt) to localized forces acting upon it, hence it yields instantaneously to the impacts of waves and the like against it. Further, because of its small radius of curvature it has a low profile drag and comparatively small surface to offer friction drag in the event of water contact. As pointed out above, the film of moving air directed over the bottom wall portion 17 of the skirt also plays a part in preventing water contact and minimizing drag in the event of such contact inasmuch as the air film serves as a lubricant.

The embodiment of the invention illustrated in FIGURE 6 has another arrangement for maintaining a film of lubricating air over the bottom surface of the skirt. In that case the inflatable skirt 108 is formed in a manner generally similar to the skirt 8 in the previously described embodiment of the invention and comprises a U-shaped wall defining member 116 and a web 13 that divides the skirt into communicated upper and lower compartments. However, the bottom wall portion 117 of the hollow skirt has a step-like configuration with a plurality of downwardly and rearwardly inclined wall portions 26 connected by crescent-shaped transversely extending and generally upright wall elements 27. The crescent-shaped wall elements 27 face generally lengthwise of the skirt and rearwardly relative to the vehicle, and the larger outlets 19 and smaller outlets 20 are formed in them so that the air issuing from each crescent-shaped wall element tends to flow along the external surface of its rearwardly adjacent inclined wall portion 26. Preferably each of the larger outlets 19 is more or less centered in its crescent-shaped wall element and is provided with a deflector or nozzle 28 that guides the air issuing from it obliquely inwardly under the vehicle hull, to maintain the necessary sustaining cushion of air under the vehicle; and the small outlets 20 in each crescent-shaped wall element are arranged in an arcuate row at each side of the larger outlet to blow a film of air over the entire inclined wall surface therebehind.

The embodiments of the invention illustrated in FIGURES 7–12 are arranged to allow very localized portions of the skirt to deflect independently of the remainder thereof, so that the skirt is well able to accommodate itself to irregularities in the surface beneath the vehicle and to pitching and rolling movements of the vehicle. To enable such independent deflection of localized portions of the skirt, it is essential that the deflection of any one portion of it should not impose stresses upon the skirt in directions lengthwise along it, particularly at those portions of the skirt where it is sharply curved, as at the bow and rear corners of the vehicle.

In the embodiment of the invention illustrated in FIGURES 7, 8 and 9 the hollow inflatable skirt 208 again comprises a U-shaped wall-defining member 216 and a web 13 that defines a larger upper compartment 11 and a smaller bottom compartment 12, and the bottom wall portion 117' of the skirt is stepped in a manner generally similar to the FIGURE 6 embodiment, but the crescent-shaped wall elements 27' are disposed obliquely to their adjacent rearwardly and downwardly inclined wall portions 26', so that the rear end portion of each inclined wall portion 26' overlaps to some extent the front end portion of its rearwardly adjacent inclined wall portion in a pleat like arrangement. At its radially inner edge each crescent-shaped wall element 27' is reinforced and supported by a U-shaped rib 29 of rubber or the like having an elliptical cross section and which extends around the inner radius of the crescent-shaped portion, terminating at the lines of connection with the web 13. As in the FIGURE 6 embodiment, each of the crescent-shaped wall elements 27' is provided with a larger outlet 19 and smaller outlets 20 at each side of the larger outlet. In addition, each of the inclined wall portions 26' can be provided with a transversely extending row of small air outlets 20', about midway between the crescent-shaped wall elements at its ends, which outlets can have the grater-tooth configuration illustrated in FIGURE 5.

To prevent the steps in the bottom wall from scooping water into the inflatable skirt when the vehicle is moving forward, the steps in the embodiments illustrated in FIGURES 6–9 are oriented, as shown in FIGURE 10, so that they face generally opposite to the direction of vehicle motion, taking account of both normal forward motion and forward motion with a normal amount of side slip.

In the embodiment of the invention illustrated in FIGURE 11 the upper compartment 11' of the inflatable skirt structure is formed separately from the bottom compartment 12'; and the latter comprises a plurality of individual bag-like elements 30, suspended from the upper compartment in contiguous relation to one another. Each is of course capable of inward and outward deflection independently of the others. The upper compartment comprises a U-shaped member 316 that extends all around the peripheral portion of the hull bottom and has its bottom apertured, as at 113, for communication with the bottom compartment.

Each of the bag-like elements 30 is open at its top for communication with the upper compartment and has flat, substantially parallel end walls 31 and a U-shaped outer wall 32 in which the outlets 19 and 20 are formed. The end walls 31 of adjacent bags are flatwise engaged to provide a seal by which air is prevented from leaking out of the plenum chamber defined by the skirt. The upper edge portions of the outer wall 32 of each bag are detachably secured to the wall of the upper compartment, as by means of screws 33, so that a damaged bag can be readily replaced.

At the bottom of its outer wall 32 each bag has a larger opening 19 through which compressed air is expelled in a direction generally inwardly of the inflatable skirt, for producing an air cushion under the vehicle, and also has rows of smaller holes 20 that can have the grater-tooth formation illustrated in FIGURE 5, for directing a lubricating film of air over the exposed external surface of the bag.

In the embodiment of the invention illustrated in FIGURE 12 the lower compartment 12" is again formed as a plurality of bag elements, each having substantially flat end walls 31' and a generally U-shaped outer wall 32', but in this case the outer wall 32' of each bag is so inclined to the end walls 31' of the bag that the several bags cooperate to define steps that very generally resemble those in the arrangements illustrated in FIGURES 6 and 7. In this case, however, the outer wall 32' of each bag is also stepped at its bottom to define large air outlets 19 that open obliquely inwardly and rearwardly relative to the skirt. The smaller air outlets 20 are formed in the lower portion of the end wall 31' of each bag, to blow air rearwardly along the inclined bottom surface of the bag therebehind.

Figure 13:
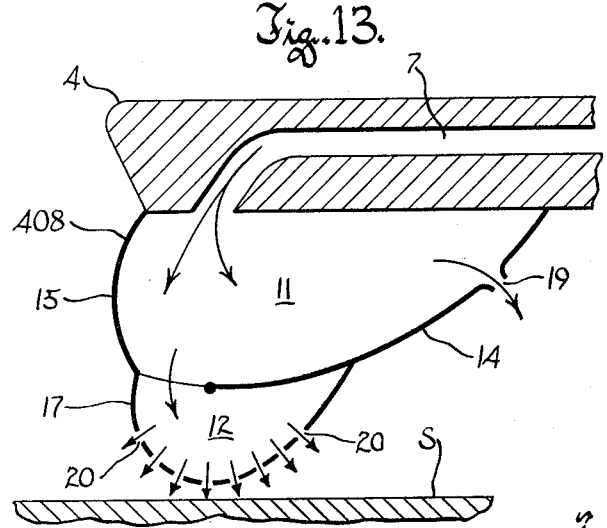

The embodiment of the invention illustrated in FIGURE 13 is similar in most respects to the first described embodiment of FIGURE 4, but only the smaller air outlets 20 are formed in the bottom wall portion 17 of the lower compartment 12, the larger air outlet 19 being formed high on the inner side wall 14 of the skirt 408 so that air is expelled directly from the upper compartment 11 into the plenum beneath the vehicle.

FIGURE 14 illustrates an embodiment of the invention employing the general principles suggested by FIGURE 13 but whereby greater hovering efficiency and stability is obtained. In this case the skirt 408 is in itself substantially identical with that illustrated in FIGURE 13, having at its bottom only small outlets 20 that provide a film of lubricating air, but there is an inner skirt 508 from which issues the air that pressurizes the plenum beneath the hull. The inner skirt 508 has an upper compartment 37 extending all around the bottom of the vehicle hull and which has its outer wall defined by the upper portion of the inner wall 14 of the skirt 408. Thus the inner upper compartment 37 is formed of a member having an upper edge 39 attached to the underside of the vehicle hull inwardly of the inner edge securement 21 of the skirt wall member 16, and having its lower edge attached to the inner wall 14 intermediate said inner edge securement and the web 13. The inner wall 14 of the skirt proper is apertured, as at 38, to permit pressurized air to flow from the upper compartment 11 of the skirt proper into said inner upper compartment 37.

The inner skirt 508 also comprises a bubble-shaped inner lower compartment 40 that depends from the inner upper compartment 37 and is substantially narrower than the latter. The two inner compartments 37 and 40 are communicated through a slot bridged by suitable tension members 41, and the inner lower compartment 40 has large air outlets 19 at its bottom through which pressurized air is expelled.

With this arrangement the outlets 19 produce an air curtain between the bottom of the lower inner compartment 40 and the surface over which the vehicle is hovering, and also produce two air cushions beneath the vehicle, one a more or less toroidal air cushion between the lower compartments 12 and 40 and just outside the air curtain, and the other lying inside the air curtain and of higher pressure than the toroidal cushion. As in the FIGURE 13 embodiment, the film of air over the bottom outer skirt surface 17, issuing from the outlets 20, helps to confine the outer air cushion within the skirt and lubricates its lower surface.

The arrangement just described makes for good hovering efficiency insofar as it provides a higher pressure air cushion inboard of the inner skirt and a somewhat lower pressure air cushion between the inner and outer skirts, inasmuch as it avoids an abrupt pressure gradient between the plenum and atmospheric air that would promote leakage of pressure air out from under the skirt. The arrangement of FIGURE 14 also makes for improved stabilization and damping of pitch and roll movements of the vehicle because the inner skirt 508 participates in the deflecting movements of the skirt proper and thus to some extent aids in adjusting skirt deflection to the hovering height of the vehicle. Of course the inner skirt 508 is capable of some degree of yielding deflection independently of the outer skirt, and can thus accommodate itself to waves that penetrate the outer skirt perimeter, but its main function is to define an annular outer air cushion between it and the outer skirt that promotes pitch and roll stability. Again, the narrowness and small area of the bottom inner compartment 40 makes for low drag in the event of water contact.

The embodiment of the invention illustrated in FIGURE 15 combines the advantages of the FIGURE 14 embodiment of the invention with those of the embodiment of the invention illustrated in FIGURE 6, and, in addition, has the advantage of enabling the outer skirt to adjust its height relative to the vehicle hull through a substantially large range.

In this case the hull 4' of the vehicle is of reinforced closed monocoque construction and has a side wall 45 that is inclined upwardly and outwardly, and the inflatable outer skirt 308 comprises three compartments, namely an uppermost compartment 111 that is disposed alongside the inclined side wall 45 of the hull and has its bottom defined by a web 113 that is substantially coplanar with the underside of the bottom wall 9 of the hull; an intermediate compartment 211 which underlies the uppermost compartment 111 and extends inwardly a distance to underlie the marginal edge portion of the hull bottom 9, and a bottom compartment 112 which is secured to the bottom of the intermediate compartment and is separated therefrom by a web 213. The bottom compartment 112 is substantially narrower than either of the compartments above it, and may be formed with a stepped bottom generally resembling that in the FIGURE 6 embodiment of the invention but having in its crescent-shape wall elements 27 only the smaller apertures 20 that provide for blowing a film of lubricating air along the inclined wall surfaces 26 behind them.

In this case a single inner compartment 40' underlies the inner portion of the intermediate compartment 211, being communicated with the intermediate compartment through slots 413 or the like in the wall 50 that it shares therewith. The inner compartment 40' is stepped in the same manner as the bottom compartment 112 of the skirt proper, but has in each of its crescent-shaped wall portions 327 a larger outlet 19 as well as a row of smaller outlets 120 that provide for lubrication of its surface. Because the inflated skirt illustrated in FIGURE 15 extends down from near the top of the hull, it has substantial overall height and is therefrom capable of substantially large range of deflection.

In the embodiments of the invention illustrated in FIGURES 14 and 15, distribution of air to the outlets can readily take place in the inflated skirt, and hence it is not necessary to arrange the ducting 7 in the hull of the vehicle in such a manner as to provide for such distribution.

It will also be apparent that the principles of the FIGURES 14 and 15 embodiments can be employed in vehicles of the type wherein one or more straight air outlet slots extend lengthwise along the bottom of the hull and one or more straight slots extend across the hull, from which slots air curtains issue that tend to stabilize the vehicle. In such cases the walls in which such air outlet slots are formed can be made as compartmented inflatable members similar to the skirts hereinabove described.

From the foregoing description taken with the accompanying drawings it will be apparent that this invention provides an air cushion vehicle having a hollow inflatable skirt depending from its hull that readily accommodates itself to waves and other irregularities of the surface beneath the vehicle, tends to stabilize the pitching, rolling and heaving movements of the vehicle, and is very narrow at its bottom so as to produce very little drag in the event of water contact. It will also be apparent that the provision for maintenance of a film of moving air over the bottom external surface of the skirt of this invention lubricates the skirt to reduce its skin friction in the event of water contact and tends to prevent compressed air under the vehicle from flowing outwardly beneath the skirt.

What is claimed as our invention is:

1. An amphibious air cushion vehicle having a hull that supports means providing a source of air under pressure and having a hollow inflatable skirt of supple material projecting downwardly from the level of the bottom of the hull around the periphery of the same, the hollow interior of said skirt being communicated with said source of air under pressure to be inflated thereby, said air cushion vehicle being characterized by:

(A) said hollow skirt comprising means defining a plurality of vertically superimposed intercommunicated compartments that are progressively narrower toward the bottom of the skirt so that the skirt has a relatively small thickness at its bottom in relation to its total depth, each of said compartments being inflatable by pressure air flowing downwardly therethrough;

(B) the lowermost compartment of the skirt being formed with
  (1) bottom step-like wall portions that are inclined downwardly and in the direction along the skirt that is generally toward the rear of the vehicle, and
  (2) transverse wall portions that face generally in said direction; and (C) the lowermost compartment of the skirt having numerous small outlet orifices in said step-like wall portions thereof, said orifices being directed along the skirt in directions generally toward the rear of the vehicle to maintain a film of moving air over the bottom portion of the external surface of the skirt.

References Cited

UNITED STATES PATENTS

| | | | |
|---|---|---|---|
| 3,291,241 | 12/1966 | Jones | 180—128 X |
| 2,446,860 | 8/1948 | Wallace | 114—67.1 |
| 3,205,847 | 9/1965 | Smith | 180-126 X |
| 3,306,388 | 2/1967 | Jones | 180—128 |
| 3,362,499 | 1/1968 | Tripp | 180—121 |
| 3,362,500 | 1/1968 | Bliss | 180—128 |
| 3,363,717 | 1/1968 | Hunt | 180—128 |
| 3,373,839 | 3/1968 | Hardy et al. | 180—128 |
| 3,375,894 | 4/1968 | Riddle | 180—128 |

A. HARRY LEVY, Primary Examiner

U.S. Cl. X.R.

114—67